A. J. KULL.
TRAP BELT.
APPLICATION FILED FEB. 19, 1914.
1,108,764.
Patented Aug. 25, 1914.
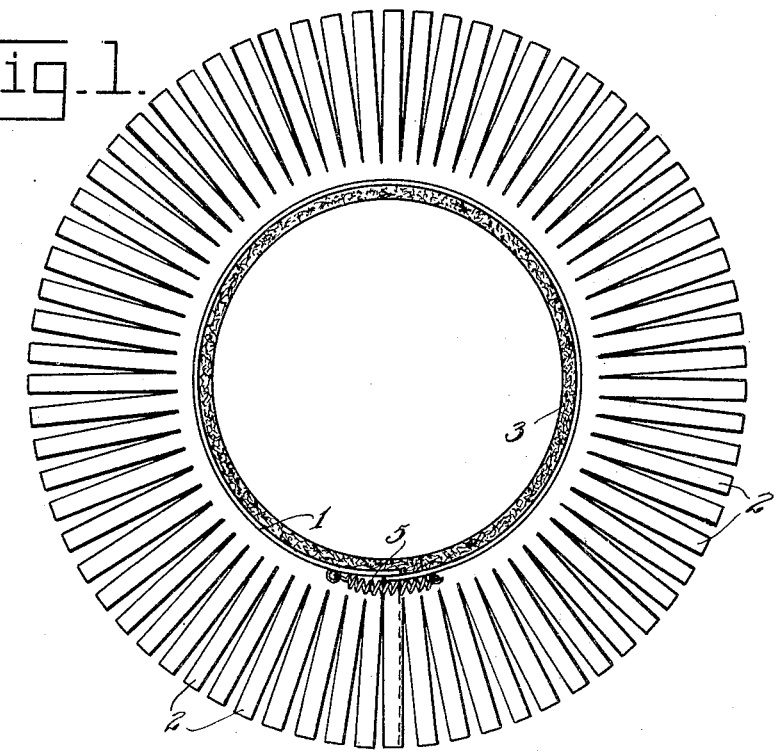
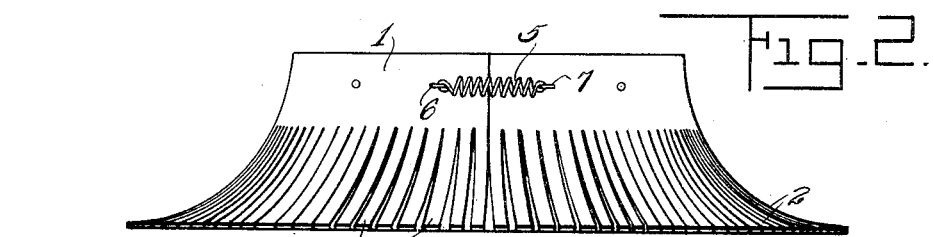
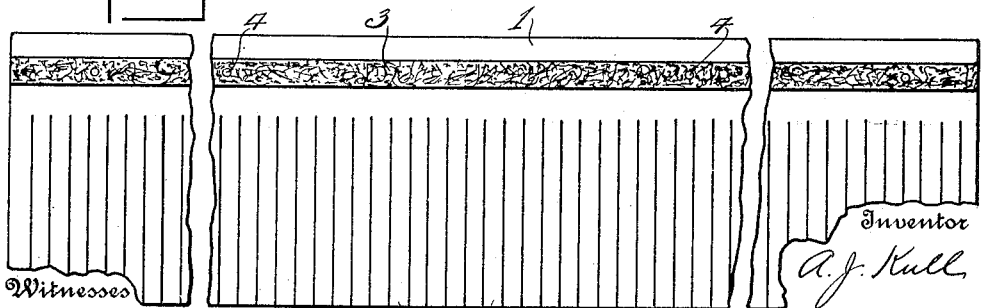

UNITED STATES PATENT OFFICE.

ALFRED JOHN KULL, OF FAR HILLS, NEW JERSEY.

TRAP-BELT.

1,108,764.
Specification of Letters Patent. Patented Aug. 25, 1914.

Application filed February 19, 1914. Serial No. 819,843.

*To all whom it may concern:*

Be it known that I, ALFRED JOHN KULL, a citizen of the United States, residing at Far Hills, in the county of Somerset and State of New Jersey, have invented certain new and useful Improvements in Trap-Belts, of which the following is a specification.

The present invention has for its object the provision of a protective device adapted for disposition about the trunks of trees, and designed primarily to form a barrier against the usual insects which destroy the foliage, as well as a guard to prevent animals, such as cats, from climbing the trees. In the latter connection the destruction of birds and their nests is carried on to a considerable extent and it has been my main object in the construction of this device to so form guard members for the same which will project outwardly from the tree trunk to such an extent that the animal is unable to leap across the same.

To the end of accomplishing the foregoing functions, my invention consists of a body of flexible material, preferably tin, or the like, which is adapted to be placed around the tree trunk, said body being cut along one edge so as to permit of relative expansion of said edge with respect to the remainder of the body, whereby upon flexing the device in disposing it as above mentioned, guard members are caused to project away from the trunk, these members comprising fingers formed by cutting the body transversely many times from the lower edge. In conjunction with the body, I employ a strip of fabric such as felt, connected to said body for interposition between the same and the tree trunk so as to prevent insects from crawling up the latter as above mentioned.

Another object of my invention is to provide a yielding connection for the extremities of the body or guard normally retaining the device in position upon the tree while permitting the same to expand in growth circumferentially during its continued use in the manner hereinbefore set forth.

With the above and other objects in view, this invention consists in the construction, combination and arrangement of parts all as hereinafter more fully described, claimed and illustrated in the accompanying drawings, wherein:

Figure 1 is a top plan view of a protector or guard constructed in accordance with my invention. Fig. 2 is a side elevation of the same; and Fig. 3 is a plan view of the device in open position looking at the inner surface of the same.

Referring to the drawing and describing my device, the numeral 1 refers to a body member which is preferably composed of flexible metallic material, of the nature of tin, though it is to be understood that any desirable material may be used in its construction which will assume the position hereinafter to be more fully described. The body 1 is of rectangular form and is cut from its lower edge transversely of the material or in an upward direction a number of times, forming a plurality of fingers 2 along its lower edge. Intermediate the uncut portion of the body 1 is secured by desirable fastening members 4, a strip of fabric such as felt 3, said felt extending longitudinally of the body from end to end.

The device as just described is designed to be placed about the trunk of a tree at any desirable height from the ground and the flexing of the body about the tree trunk will cause the fingers or the entire lower edge of the same to assume a flaring position shown in Figs. 1 and 2 of the drawings with the fingers projecting outwardly from the trunk of said tree. This is due to the cutting of the lower edge of the body which permits a relative expansion of this portion with respect to the uncut portion of the upper edge of the same.

Any desired fastening means for holding the device in the position about the tree trunk may be employed, and as illustrated in the drawings, a yielding member or spring 5 is secured to one end of the device in an eye 6 and engaged over a hook 7 on the other end. A slight lap of the ends is desirable so as to permit the body to yield to the growth of the trunk of the tree circumferentially in the manner hereinbefore described.

It will be obvious that the device is extremely simple and may be very cheaply manufactured from various materials susceptible of flexing in the manner above mentioned, and the body of the same may be colored or painted so that it will have an ornamental appearance when desirable.

The advantages of the invention will be clearly understood from the foregoing description though it may be mentioned that the felt which is pressed against the tree trunk will prevent insects from crawling past the device while the fingers 2 will form an obstacle which will eliminate likelihood of depredating animals from jumping across the same.

Having thus described my invention what I claim as new is:

1. A trap belt comprising a body of flexible material for disposition about the trunk of a tree and having guard members formed thereon by cutting the material transversely a portion of the width of said material whereby upon flexing the same about the tree to cause the guard members to curve longitudinally, and assume a position projecting away from the tree with their extremities spaced from each other.

2. A trap belt comprising a body of flexible metallic material adapted to be disposed about the trunk of a tree and having a plurality of curved guard members spaced from the tree and formed by cutting the material transversely the greater portion of its width a number of times, the uncut portion constituting a band adapted to fit closely to the tree, a fabric member secured to the inner surface of the band portion, and a flexible connection connecting the ends of the band to permit expansion of said belt.

In testimony whereof I affix my signature in presence of two witnesses.

ALFRED JOHN KULL.

Witnesses:
T. V. TERRELL,
J. W. ZACHARY.

---

Copies of this patent may be obtained for five cents each, by addressing the "Commissioner of Patents, Washington, D. C."